United States Patent
Lukich et al.

[11] Patent Number: 6,133,643
[45] Date of Patent: Oct. 17, 2000

[54] METHOD FOR DETERMINING GOVERNOR GAINS FOR A FUEL CONTROL SYSTEM

[75] Inventors: Michael S. Lukich; Larry E. Schmidt, both of Chillicothe, Ill.

[73] Assignee: Caterpillar Inc., Peoria, Ill.

[21] Appl. No.: 08/946,437

[22] Filed: Oct. 7, 1997

[51] Int. Cl.⁷ .............................. F02N 11/06; H02D 9/04
[52] U.S. Cl. .................. 290/40 A; 290/40 R; 290/40 B; 290/40 C; 290/40 F; 290/51
[58] Field of Search ................. 290/40 A, 40 B, 290/40 C, 40 R; 123/501, 527, 357, 358; 60/931, 433

[56] References Cited

U.S. PATENT DOCUMENTS

| | | | |
|---|---|---|---|
| 4,277,945 | 7/1981 | Esthimer et al. | 60/710 |
| 4,425,888 | 1/1984 | Engel et al. | 123/339 |
| 4,470,118 | 9/1984 | Morrison | 364/431 |
| 4,493,303 | 1/1985 | Thompson et al. | 123/357 |
| 4,498,016 | 2/1985 | Earleson et al. | 290/40 |
| 4,597,368 | 7/1986 | Ament | 123/339 |
| 4,616,616 | 10/1986 | Staniak et al. | 123/357 |
| 5,005,354 | 4/1991 | Schneider | 60/39.281 |
| 5,134,845 | 8/1992 | Romano | 60/39.281 |
| 5,214,916 | 6/1993 | Lukich | 60/431 |
| 5,343,780 | 9/1994 | McDaniel et al. | 477/108 |
| 5,623,909 | 4/1997 | Werheimer | 123/501 |
| 5,647,317 | 7/1997 | Weisman et al. | 123/299 |

FOREIGN PATENT DOCUMENTS

| | | | |
|---|---|---|---|
| 0393642 | 10/1990 | European Pat. Off. | F02D 41/16 |
| 0562511 | 9/1993 | European Pat. Off. | F02D 41/14 |

*Primary Examiner*—Elvin Enad
*Attorney, Agent, or Firm*—W. Bryan McPherson

[57] ABSTRACT

The present invention is adapted to provide a method for dynamically determining optimal governor dynamics, i.e., gains, for a fuel control system supplying fuel to an engine. The method determines a mode of the engine, then determines the governor gain in response to the engine mode. The mode or condition of the engine includes a transmission mode, a throttle mode, and a cruise control mode. The governor gains are determined by determining the current engine mode, selecting the appropriate gain look-up table in response to the engine mode, and responsively selecting a gain value from the look-up table in response to at least one of the desired and actual speed. The gain maps are determined using empirical data and classical control system design methods, and storing the results in gain maps, or tables. The governor gain values are used in a forward and a feedback path PID control algorithm. The forward path PID control algorithm determines a fuel command in response to at least one of the desired engine speed, and modified actual engine speed, and the governor gain values. The feedback path PID control algorithm determines a modified actual speed in response to at least one of the desired and actual speeds, and the appropriate governor gain values.

16 Claims, 4 Drawing Sheets

METHOD FOR DETERMINING GOVERNOR GAINS FOR A FUEL CONTROL SYSTEM

TECHNICAL FIELD

The present invention relates generally to a fuel control system, and more particularly, to a method for dynamically scheduling sets of governor gains for an engine depending on operating conditions.

BACKGROUND ART

Fuel quantity for an engine is determined by a governor. In typical engine systems, the governor bases the determination of how much fuel to provide to the engine based on, in part, the actual speed and desired speed of the engine. In typical engine systems, when there is a sudden change in engine speed or load there is generally a large difference between the desired and actual engine speeds; thereby causing unresponsive behavior of the engine. For example, if a machine encounters a hill, and the operator presses the throttle of the engine to acquire more speed the engine will be unresponsive. Much of this problem is attributed to the current governor control strategies, which rely on a set of governor gains that do not appropriately account for sudden changes in surrounding conditions, such as a brief period of sudden and heavy acceleration.

The present invention is directed to overcoming one or more of the problems as set forth above.

DISCLOSURE OF THE INVENTION

In one aspect of the present invention, a method for dynamically determining at least one governor gain for an engine is disclosed. The method includes determining a condition of the engine, and then determining at least one governor gain in response to the condition.

BEST MODE FOR CARRYING OUT THE INVENTION

Figure 1:
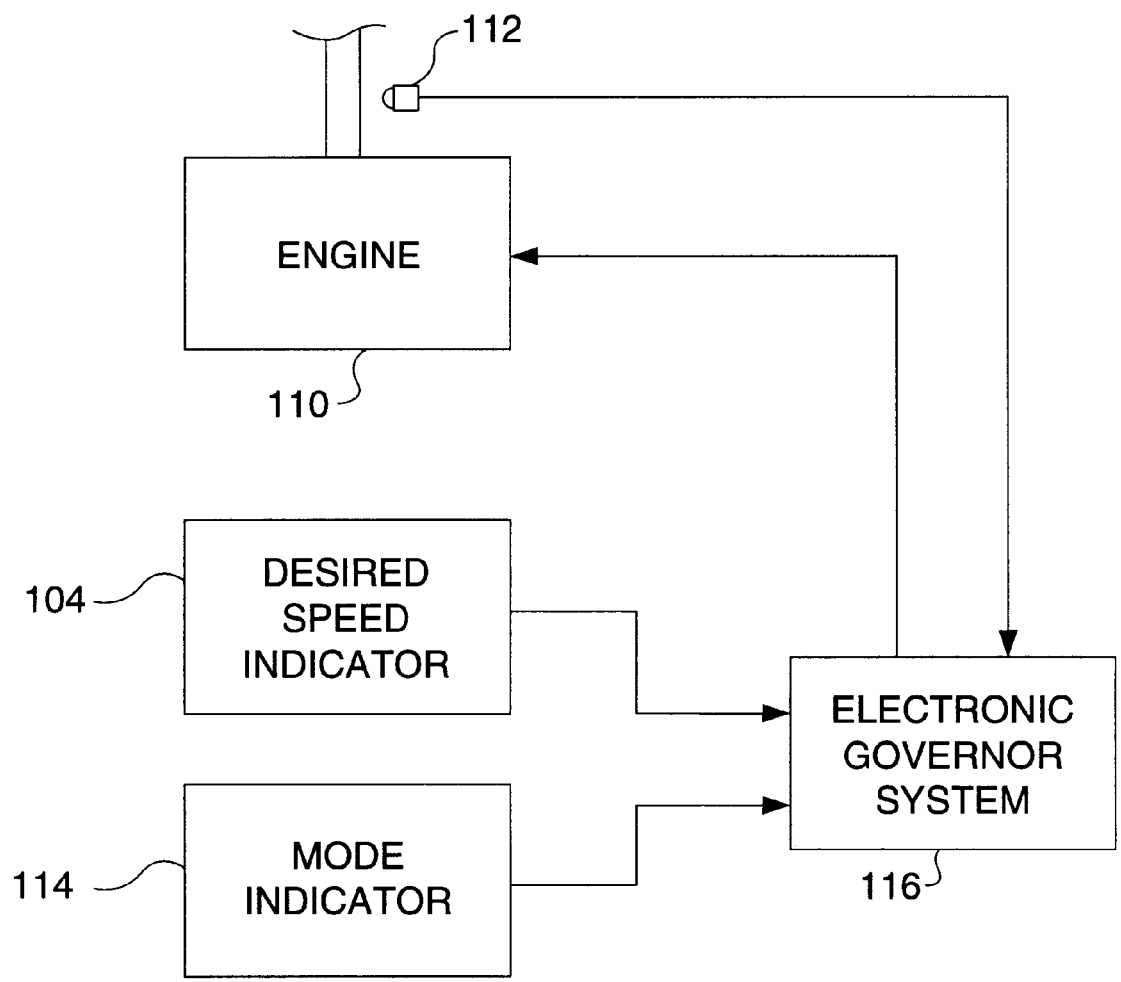
FIG. 1 illustrates a diagrammatic view of a fuel control system.
Figure 2:
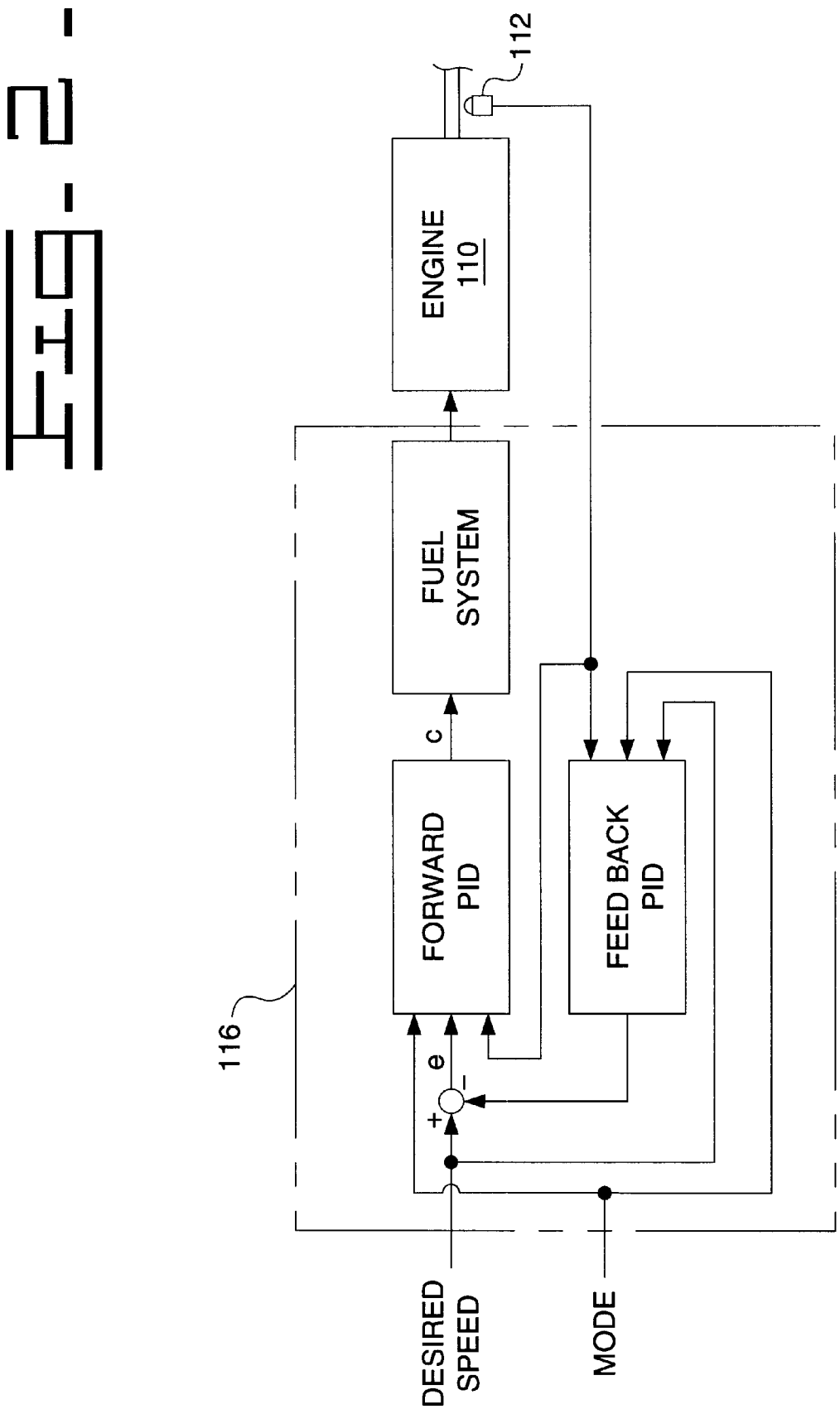
FIG. 2 illustrates a diagrammatic view of a forward and a feedback path PID control algorithm.

FIG. 1 illustrates an embodiment of a fuel control system 102 associated with the present invention. The present invention provides a method for dynamically determining a governor gain for an electronic governor system 116, such that optimal engine performance will result. The quantity of fuel to be delivered to an engine 110 is determined by the electronic governor system 116. The electronic governor system 116, which includes an electronic governor, determines an appropriate fuel command in response to the current engine mode and the desired and actual engine speeds. The electronic governor system 116 utilizes classical forward and feedback path PID (proportional, integral, derivative) control algorithms to determine the fuel command, as illustrated in FIG. 2. An example of a classical forward path (discrete) PID is shown below.

$$c_i = K_p e_i + K_I \sum_{j=0}^{i} e_j + K_D(e_i - e_{i-1})$$

Where
$e_j$=error(desired speed−modified actual speed)
$C_I$=Command (Fuel) at time $t_i$
$K_P$=Proportional gain of the governor
$K_I$=Integral gain of the governor
$K_D$=Derivative gain of the governor An example of a classical feedback path PID is shown below.

$$MES_i = K_p n_i + K_I \sum_{j=0}^{i} n_j + K_D(n_i - n_{i-1})$$

Where
n=engine speed
$MES_i$=Modified Engine Speed at time $t_i$
$K_P$=Proportional gain of the governor
$K_I$=Integral gain of the governor
$K_D$=Derivative gain of the governor The accuracy of both the forward and feedback path PID algorithms are dependent on the governor gain values used in the algorithms (shown here as $K_P$, $K_I$, $K_D$). Engine and fuel system dynamics vary significantly depending on the particular operational mode of the engine. Therefore, the purpose of the present invention is to dynamically determine the appropriate gain values needed to provide optimal engine performance at any given time in response to the current mode of the engine 110. The operation of both the forward and feedback algorithms will be discussed in more detail below.

Figure 3:
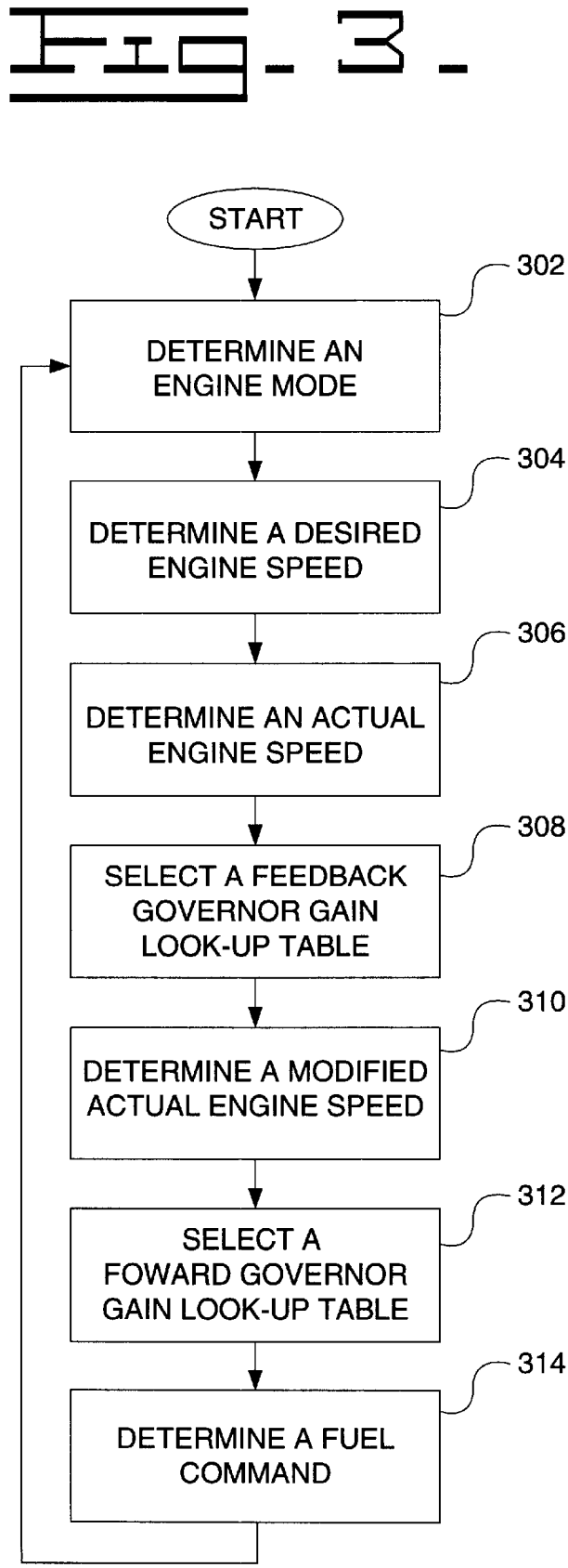
FIG. 3. is a flow chart depicting the method used to determine the appropriate gain values.

The method of operation of the present invention is illustrated in FIG. 3. In a first control block 302, the engine mode is determined. For the purpose of determining governor gain values, the engine mode includes a throttle mode, a cruise control mode, and a transmission shift mode. In the throttle mode, the desired engine speed is controlled by manual inputs from a throttle. In the cruise control mode, the desired engine speed is controlled in an automated manner, e.g., by a cruise control system. In the transmission shift mode, the governor gain values are controllable in response to the shifting of the transmission (not shown). The engine mode is determined by a mode indicator 114. The mode indicator 114 makes the determination based on monitoring an operator controllable cruise control switch (not shown), and a transmission (not shown) which is connected to the engine 110. In a second control block 304, the desired engine speed is determined by a desired speed indicator 104. The desired speed indicator 104 may include operator control elements (not shown) such as joysticks. The operator control elements produce electrical signals in a well known manner. For instance, a potentiometer or digital encoder, may be utilized to produce an electrical signal indicative of operator demand for a desired speed. Alternatively, a throttle plate position may be sensed in applications involving spark ignited engines. The desired speed indicator 104 generates a desired speed signal. In a third control block 306, an actual engine speed is determined. A speed sensing device 112, provides an actual speed signal representative of the actual engine speed. For example, the speed sensing device 112 is sensitive to the passing of gear teeth by a magnetic pickup mounted on the engine 110, as is well known in the art. The speed sensing device 112 delivers an actual speed signal to the electronic governor system 116. Based on the engine mode, and the desired and actual engine speeds, the electronic governor system 116 determines a fuel command that will used to control the amount of fuel delivered to the engine 110.

In the preferred embodiment the fuel command is determined using classical forward and feedback path PID control algorithms that are well known in the art, as shown above. In the preferred embodiment the governor gain values utilized by the forward path PID algorithm are independent of the gain values utilized by the feedback path PID algorithm. The selection of the governor gain values is critical to ensure engine performance, e.g., load acceptance, throttle responsiveness, speed regulation. The forward path PID algorithm determines a fuel command in response to the desired speed signal, a modified actual engine speed signal (to be discussed later), and the appropriate gain values.

In the preferred embodiment, a feedback path PID algorithm is used to determine a modified actual speed. A modified actual engine speed is determined for performance reasons. For example, it may be determined that under certain conditions, the difference between the actual and desired engine speeds should be magnified in order to provide a more appropriate fuel command to achieve optimal engine performance. Therefore, the feedback path PID algorithm, which is responsive to the governor gain values, modifies the actual speed value in order to influence the ultimate fuel command.

Figure 4:
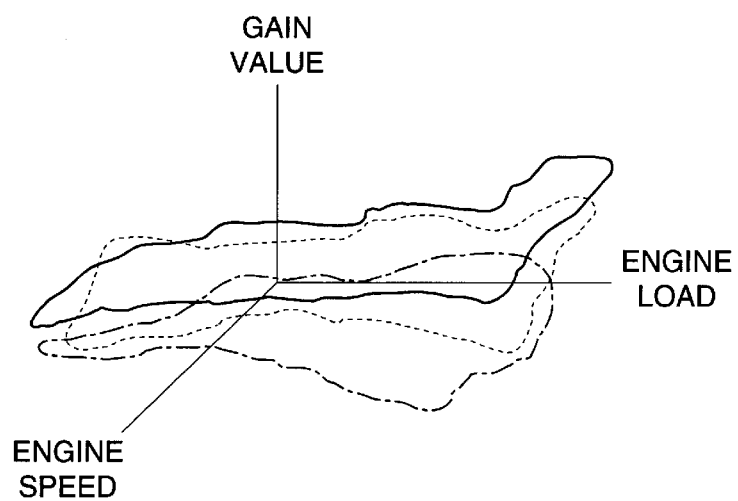
FIG. 4 illustrates a gain map (or table) for the control mode, throttle mode, and transmission shift mode; and, FIG. 5 illustrates a diagrammatic view of a fuel control system.

The governor gain values used in the forward and feedback path PID algorithms vary significantly in response to engine mode, desired speed, actual speed, and the engine load indicator, if used, as shown in FIG. 4. Examples of engine load indicators include, manifold pressure, exhaust temperature, and engine torque. The incorporation of engine load into the determination of the governor gains will be discussed later, as an alternative embodiment. The look-up tables shown in FIG. 4 are illustrative and the actual values may vary depending upon desired engine performance. A separate gain look-up table (or gain map) is utilized for each of the engine modes, and for each of the controllers, i.e., forward and feedback path PID. In the preferred embodiment, each individual governor gain, e.g., $K_P$, $K_I$, $K_D$, has a corresponding gain look-up table. Each look-up table contains stored governor gain values corresponding to predetermined values for the desired and actual speed. The number of gain values stored in the look-up table is dependent upon the desired precision of the system. The method selects a governor gain value from the appropriate look-up tables corresponding to the current engine mode, and at least one of the measured desired and actual engine speeds. Numerical interpolation may be used to determine the actual governor gain value in the event the measured desired and actual speed values fall between the discrete values used to form the look-up tables. The table values are derived from simulation and analysis of empirical data indicative of the engine and fuel system dynamics. Although a look-up table is described, it is well known in the art that an empirical equation (or sets of) may readily be substituted for the look-up table if greater accuracy is desired. When creating the look-up tables, the respective coefficients, i.e. governor gain values, used for both the forward and feedback path PID control algorithm, are determined either empirically using well known Ziegler-Nichols tuning techniques or analytically using Root Locus, and Bode, or Nyquist design methods.

In the operation of the fuel control system 102, and with reference again to FIG. 3, after the engine mode, and desired and actual speeds are determined, control then passes to a fourth control block 308. In the fourth control block 308, a feedback governor gain lookup table is selected based on the current engine mode. In a fifth control block 310, the feedback path PID algorithm determines a modified actual engine speed signal by selecting the governor gain from the selected gain look-up table, that corresponds to at least one of the current desired speed and the actual engine speeds. In a sixth control block 312, a forward governor gain lookup table is selected based on the current engine mode. In a seventh control block 314, the forward path PID algorithm determines a fuel command by selecting a governor gain from the selected look-up table that corresponds to the modified actual engine speeds. The fuel command is then used to control the amount of fuel delivered to the engine 110. The method shown in FIG. 3 is a continuous process which operates while the engine 110 in operation.

The method for dynamically determining the governor gains used by the fuel control system 102, and the associated look-up tables and forward and feedback path PID algorithms, are embodied in a microprocessor based system which utilizes arithmetic units to control process according to software programs. Typically, the programs are stored in read-only memory, random-access memory or the like.

Figure 5:
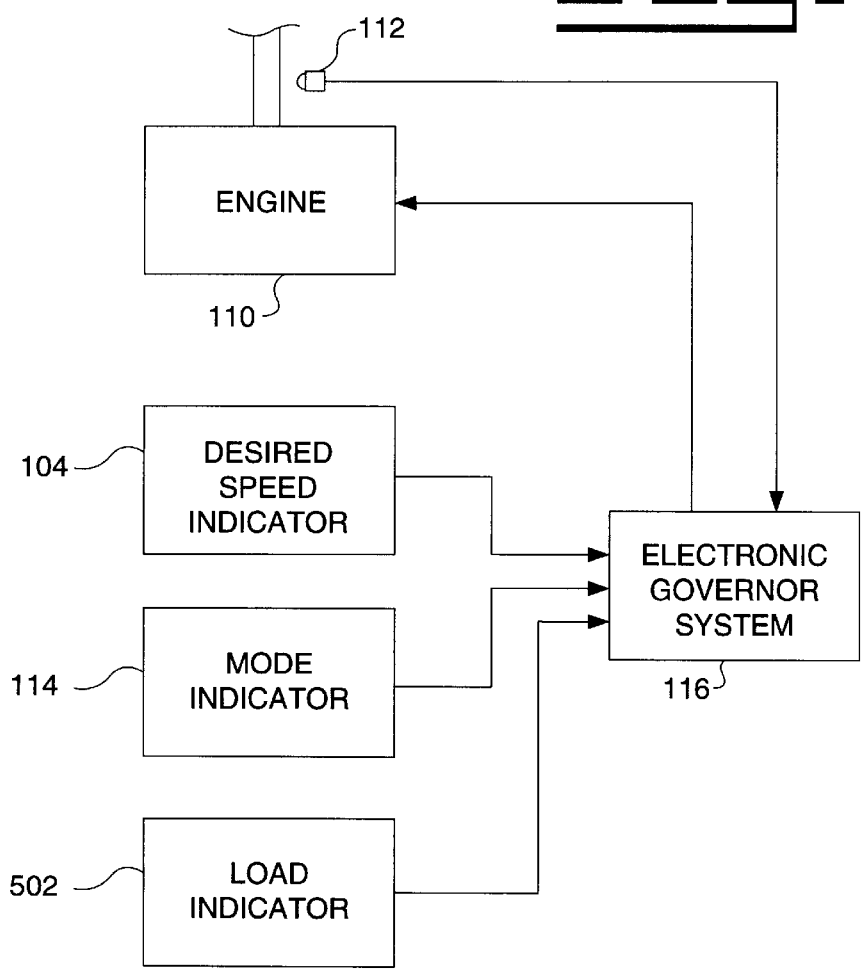

In an alternative embodiment, an indicator of actual engine load (such as manifold pressure, exhaust temperature, engine torque, etc.) is additionally taken into account when determining the appropriate governor gains, as illustrated in FIG. 5. Multi-dimensional look-up tables are created based on engine mode, indicated engine load, and at least one of the desired and actual engine speeds. A look-up table is selected for each governor gain based on the current engine mode. A gain value is selected from the look-up table in response to the current engine load, and desired and actual speed.

Industrial Applicability

With reference to the drawings and in operation, the present invention is adapted to provide a method for dynamically determining a governor gain for a fuel control system supplying fuel to an engine. The method determines a mode of the engine, then determines a governor gain in response to the engine mode. The mode or condition of the engine includes a transmission mode, a throttle mode, and a cruise control mode. The governor gains are determined by determining the current engine mode, selecting the appropriate gain look-up table in response to the engine mode, and responsively selecting a gain value from the look-up table in response to at least one of the desired and actual speed. The gain maps are determined using empirical data, and storing the results in gain maps, or tables. The governor gain values are used in a forward and a feedback path PID control algorithm. The forward path PID control algorithm determines a fuel command in response to the governor gain values, and at least one of the desired engine speed, and modified actual engine speed. The feedback PID control algorithm determines a modified actual speed in response to at least one of the desired and actual speeds, and the appropriate governor gain values. A modified actual speed is determined in order to enhance the performance of the engine by adjusting the difference between the desired and actual speeds to influence the amount of fuel provided to the engine in particular circumstances.

Other aspects, objects, and features of the present invention can be obtained from a study of the drawings, the disclosure, and the appended claims.

What is claimed is:

1. A method for dynamically determining a governor gain for a control algorithm of a fuel control system having a forward control algorithm, a feedback control algorithm, and an engine, comprising the steps of:

determining an engine mode;

sensing a desired speed of said engine and responsively generating a desired speed signal;

sensing an actual speed of said engine and responsively generating an actual speed signal; storing a forward governor gain look-up table for each engine mode, said look-up tables corresponding to a plurality of said desired speeds and modified actual engine speeds;

storing a feedback governor gain look-up table for each engine mode, said look-up tables corresponding to a plurality of said desired and actual engine speeds;

receiving said desired and actual speed signals and selecting a feedback governor gain look-up table in response to said engine mode, and selecting said feedback gain value from said feedback governor gain look-up table in response to said desired and actual speed signals, determining a modified actual speed in response to said feedback gain value, and generating a modified actual speed signal; and, receiving at least one of said desired and modified actual speed signals and selecting a forward governor gain look-up table in response to said engine mode, and selecting said forward gain value from said forward governor gain look- up table in response to said desired and modified actual speed signals, determining a fuel command in response to said forward gain value, and delivering said fuel command to said engine.

2. A method for dynamically determining a governor gain for a control algorithm of a fuel control system having a forward control algorithm, a feedback control algorithm, and an engine, comprising the steps of:

determining an engine mode is one of a cruise control mode, a throttle mode, and a transmission shift mode;

sensing a desired speed of said engine and responsively generating a desired speed signal;

sensing an actual speed of said engine and responsively generating an actual speed signal;

sensing a load of said engine and responsively generating a load signal;

storing a forward governor gain look-up table for each engine mode, said look-up tables corresponding to a plurality of said desired speeds and a modified actual engine speeds, and said engine load;

storing a feedback governor gain look-up table for each engine mode, said look-up tables corresponding to a plurality of said desired and actual engine speeds, and said engine load;

receiving said desired and actual speed signals, and said load signal, and selecting a feedback governor gain look- up table in response to said engine mode, and selecting said feedback gain value from said feedback governor gain look-up table in response to said load signal, and said desired and actual speed signals, determining a modified actual speed in response to said feedback gain value, and generating a modified actual speed signal; and, receiving at least one of said desired and modified actual speed signals and selecting a forward governor gain look-up table in response to said engine mode, and selecting said forward gain value from said forward governor gain look- up table in response to said load, said desired and modified actual speed signals, determining a fuel command in response to said forward gain value, and delivering said fuel command to said engine.

3. A method of dynamically determining a governor gain for a control algorithm of a fuel control system having a forward control algorithm, a feedback control algorithm, and an engine, comprising the steps of;

determining an engine mode;

establishing a desired speed of said engine;

sensing an actual speed of said engine;

determining a feedback governor gain value in response to said engine mode, and at least one of said desired speed and said actual speed;

modifying said sensed actual speed in response to said feedback gain value;

determining a forward gain value in response to said engine mode, and at least one of said desired speed and said modified actual speed; and, determining a fuel command in response to said forward gain value, and delivering said fuel command to said engine.

4. A method, as set forth in claim 3, wherein the step of determining a feedback governor gain value further comprises the steps of:

selecting a feedback governor gain look-up table in response to said engine mode, said look-up table corresponding to a plurality of desired and actual engine speeds; and, selecting said feedback gain value from said feedback governor gain look-up table in response to at least one of said desired and actual speeds.

5. A method, as set forth in claim 3, wherein the step of determining a feedback governor gain value further comprises the step of selecting said feedback gain value from a feedback governor gain look-up table in response to said engine mode and at least one of said desired and actual speeds.

6. A method, as set forth in claim 4, wherein the step of determining a forward gain value further comprises the steps of:

selecting a forward governor gain look-up table in response to said engine mode, said look-up table corresponding to a plurality of desired and actual engine speeds; and, selecting a forward gain value from said forward governor gain look-up table in response to at least one of said desired and modified actual speed signals.

7. A method, as set forth in claim 5, wherein the step of determining a feedback gain value further comprises the step of selecting a feedback gain value from a feedback governor gain look-up table in response to said engine mode and at least one of said desired and modified actual speed signals.

8. A method, as set forth in claim 6, further comprising the step of determining a load of said engine.

9. A method, as set forth in claim 8, wherein said forward governor gain look-up table corresponds to a plurality of desired engine speeds, actual engine speeds, and engine loads.

10. A method, as set forth in claim 9, wherein the step of selecting a forward governor gain further comprises the step of selecting a forward governor gain in response to selecting a forward gain value from said forward governor gain look-up table in response to at least one of said desired speed, said actual speed and said load.

11. A method, as set forth in claim 10, wherein said feedback governor gain look-up table corresponds to a plurality of desired engine speeds, actual engine speeds, and engine loads.

12. A method, as set forth in claim 11, wherein the step of selecting a feedback governor gain further comprises the step of selecting a feedback governor gain in response to selecting a feedback gain value from said forward governor gain look-up table in response to at least one of said desired speed, said actual speed and said load.

13. An apparatus adapted to control an engine, comprising:

an actual speed sensor adapted to sense a parameter indicative of an actual speed of said engine and responsively generate an actual speed signal;

a desired speed indicator adapted to sense a parameter indicative of a desired speed of said engine and responsively generate a desired speed signal; and, a microprocessor adapted to receive said actual speed signal and said desired speed signal, establish a mode of said engine, determine a feedback governor gain value in response to said engine mode and at least one of said desired speed and said actual speed, modify said actual speed signal in response to said feedback gain value, determine a forward gain value in response to said engine mode, and at least one of said desired speed and said modified actual speed, determine a fuel command in response to said forward gain value, and deliver said fuel command to said engine.

14. An apparatus, as set forth in claim 13, wherein said microprocessor is further adapted to select a feedback governor gain look-up table in response to said engine mode, said look-up table corresponding to a plurality of desired and actual engine speeds, and select a feedback gain value from said feedback governor gain look-up table in response to at least one of said desired speed signal and said actual speed signal.

15. An apparatus, as set forth in claim 14, wherein the microprocessor is further adapted to select a forward governor gain look-up table in response to said engine mode, said look-up table corresponding to a plurality of desired and actual engine speeds, and select a forward gain value from said forward governor gain look-up table in response to at least one of said desired speed signal and said modified actual speed signal.

16. A method of dynamically determining a governor gain for a control algorithm of a fuel control system having a forward control algorithm, a feedback control algorithm, and an engine, comprising the steps of:

determining an engine mode;

establishing a desired speed of said engine;

sensing an actual speed of said engine;

determining a feedback governor gain value in response to said engine mode, and at least one of said desired speed and said actual speed;

modifying said sensed actual speed in response to said feedback gain value;

determining a forward gain value in response to said engine mode, and at least one of said desired speed and said modified actual speed, said forward gain value being located on a forward governor gain look-up table corresponding to a plurality of desired and actual engine speeds; and, determining a fuel command in response to said forward gain value, and delivering said fuel command to said engine.

* * * * *